Jan. 15, 1963  R. O. KINGSLEY  3,073,100
MOWER HAVING HELICAL CUTTER BLADE
Filed Aug. 15, 1960

INVENTOR.
RICHARD O. KINGSLEY
BY Norman K. Buff

3,073,100
MOWER HAVING HELICAL CUTTER BLADE
Richard O. Kingsley, 345 23rd, St. Maries, Idaho
Filed Aug. 15, 1960, Ser. No. 49,635
6 Claims. (Cl. 56—26)

This invention relates to cutters of growing vegetation and more particularly to an improved cutting mechanism for mowers.

While mowers of various sizes are employed for cutting different vegetation, as for example, lawn, hay and other crops, my present invention is disclosed as it relates to a mower for cutting hay and grasses. But, it should be understood that the invention is not limited to such use only and that alterations and changes which are comprehended within the scope of the following claims are contemplated.

According to the present invention, it is an object to provide an improved cutting mechanism which substitutes for the conventional reciprocating cutter. Since the invention is embodied in a rotating cutter, it is not plagued with the limitations prevalent in the conventional reciprocating cutter. For example, the speed of operation is in no way limited as is true with the reciprocating cutter having a conventional pitman mechanism.

The rotating cutter specifically comprises a journaled shaft about which is fixed a helical flange of uniform pitch and radial dimension and which is provided with a helicoid flat cutting blade on the outer marginal edge of the flange. The blade is disposed at a divergent angle with respect to the axis of the shaft.

It is a further object of the present invention to provide a sharpening face on the blade which is disposed at an imaginary cylinder homocentric to the axis of said shaft, thus facilitating sharpening the blade by rotating the blade and applying a straight abrading stone, or equivalent sharpening device, to the sharpening face with the stone parallel to the axis of the rotating shaft.

Yet another object of the present invention lies in the provision of a cutting mechanism which may be readily used in mowers or harvesting machines of existing construction, and which are very easily maintained so as to minimize operational interruptions during use of the device.

The foregoing and other important objects and advantages of the invention will become apparent as the complete disclosure of a preferred embodiment of the invention is read in the following detailed description considered in conjunction with the accompanying sheet of drawings in which like numerals are employed to designate like parts.

Figure 1:
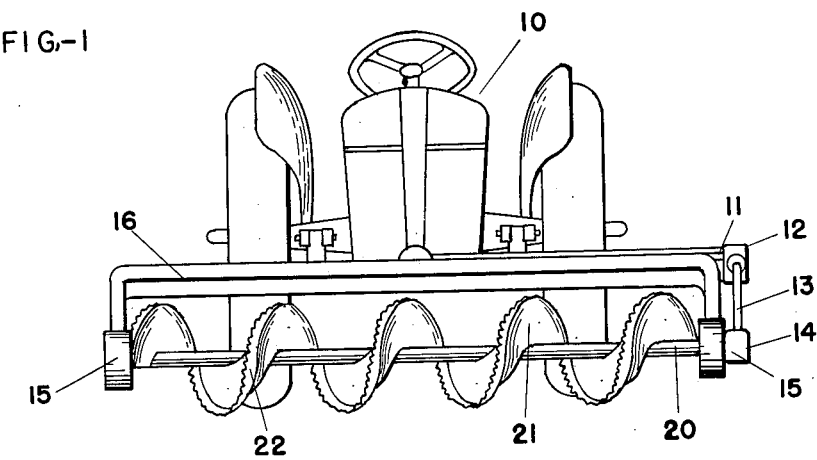
FIGURE 1 is a front elevational view of my improved mower mounted upon the mobilizing and powering vehicle.

The combined structure illustrated in FIGURE 1 is merely representative of numerous types of crop harvesters in which the improved cutting mechanism may be employed. This structure is therefore typical and is not intended to constitute a limitation upon the applicability of the cutting mechanism to specific vehicular supported mowers or the manually operated type.

In FIGURE 1, numeral 10 indicates in its entirety a wheeled tractor of well-known construction for example, as shown in U.S. Patent No. 2,691,453. The tractor is provided with a power take-off 11 which, through suitable transmission means 12, 13, and 14, is adapted to drive a shaft 20 journaled at 15—15 on the frame 16 supported and mobilized by the tractor 10.

It will be noted that the shaft 20 extends transversely of the path of movement of the tractor substantially parallel to the surface over which the frame 16 is adapted to move.

Beginning at one end of the shaft and continuing to the opposed end thereof, I provide a helical flange 21 which is uniform in pitch and radial dimension and is fixed homocentrically about the shaft 20 at right angle to its axis. The flange may be secured to the shaft in any suitable manner, however, I prefer to secure it by welding, whereby to keep to a minimum any projections on the opposed side faces of the flange 21.

The flange constitutes means for supporting a helicoid flat cutting blade 22. However, I prefer to employ a solid flange so that the severed vegetation will not find areas upon which to catch during operation of the mower.

The helical flange is provided with an outer marginal edge face 23 which is disposed at an angle (approximately 12 degrees from parallel to the axis of the shaft 20). This angle of course, may vary within limits but it is necessary that it shall be sufficient to be removed from parallelism with the axis of the shaft 20 in the construction disclosed in FIGURE 2. The purpose of the angular edge face 23 is to provide a divergent angle to the cutter blade 22 with respect to the axis of the shaft 20.

It will be noted that the flange 21 is provided with circumferentially spaced internally threaded bores 24 which are adapted to receive cooperating bolts 25 which pass through apertures 26 formed in the marginal edge portion in the helicoid cutter blade adjacent to its base edge 27 thus releasably securing the cutter blade 22 thereon. When it becomes necessary by reason of wear or breakage it is a simple matter to remove and replace the cutter blade in this manner.

It is to be noted that the cutter blade 22, because of its divergent angle with respect to the axis of the shaft 20, may be sharpened to present a cutting edge 28 by forming a sharpening face 29 on the blade, which face 29, is disposed at an imaginary cylinder homocentric to the axis of the shaft 20. It therefore becomes obvious that the blade may be easily sharpened by applying to the face 29 an elongated straight abrading stone or other sharpening implement 30 in exact parallel relationship to the axis of the shaft 20 while rapidly rotating the shaft 20.

If desired, the cutting edge 28 may be provided with serrations, as seen at 28'.

Figure 2:
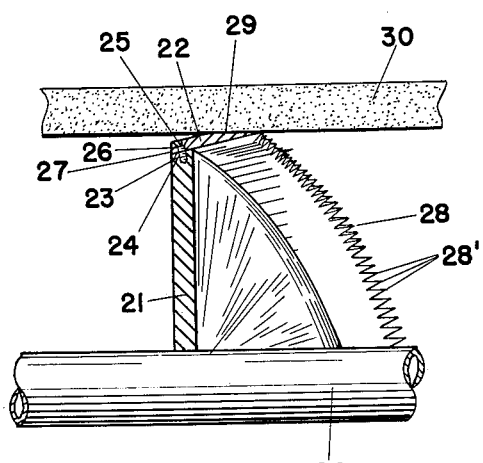
FIGURE 2 is an enlarged fragmentary vertical sectional view on a vertical plane coincident to the axis of the shaft and looking forwardly of the mower.
Figure 3:
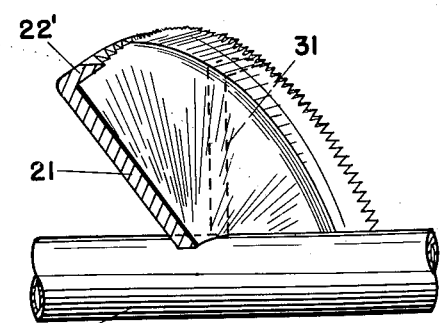
FIGURE 3 is a view of a modified cutter on an oblique plane coincident to the axis of the shaft and looking forwardly of the mower.

In the species disclosed in FIGURE 3 of the drawing, I have formed the cutter blade 22' integrally with the helical flange 21 while in every other respect, such as the divergence of the cutter blade from the axis of the shaft 20, the structure is identical to that previously described with respect to FIGURE 2.

Because of the oblique angle at which the section of FIGURE 3 is taken, it appears that the cutter blade 22 is 90° to the helical flange 21, but inspection of a vertical section as shown by the broken lines of 31 will reveal a similar divergent angle to the cutter blade 22'.

Various subsidiary features of the invention, not specifically enumerated herein, will undoubtedly occur to those versed in the art as likewise will various modifications and alterations in the preferred design illustrated, all of which may be achieved without departing from the spirit and scope of the invention as defined in the appended claims.

Having thus described my invention what I claim as new and desire to secure by Letters Patent of the United States is:

1. In a mower of the class described, a mobilized frame; a transverse shaft journaled in said frame and substantially axially parallel to the surface over which the frame is adapted to move and athwart of the general direction of movement; a helical flange of uniform pitch and radial dimension homocentrically fixed about said shaft and disposed at right angles thereto, a helical flat cutting blade on the outer marginal edge of said flange, said blade being disposed at a divergent angle with respect to the axis of said shaft; and power means for rotating said shaft.

2. In a mower of the class described, having a powered rotatable helical flange of uniform pitch and radial extension disposed at right angles to its axis, the improvement comprising, a helicoid cutter blade on the outer marginal edge of said flange, and disposed at a divergent angle with respect to the said axis.

3. In a mower of the class described having a powered rotatable helical flange of uniform pitch and radial extension disposed at right angles to its axis and a helicoid cutter blade on the marginal edge thereof, the improvement comprising, said blade being disposed at a divergent angle with respect to said axis, and a sharpening face on the blade disposed coincident to an imaginary cylinder homocentric to said axis.

4. The invention of claim 3 further characterized by said blade being separable from said flange, and means releasably securing said blade to said flange.

5. In a mower of the class described, a helicoid cutter blade of uniform pitch and radial disposition; said blade having opposed cutting and base edges, presented substantially longitudinally of the axis thereof, and being disposed at a divergent angle with respect to said axis from said base edge to said cutting edge, and a sharpening face on the blade and disposed at an imaginary cylinder homocentric to said axis.

6. The cutter blade of claim 5 further characterized by said cutting edge being serrated.

References Cited in the file of this patent

UNITED STATES PATENTS

| | | |
|---|---|---|
| 2,056,369 | Roessel | Oct. 6, 1936 |
| 2,634,567 | Huitema | Apr. 14, 1953 |
| 2,711,067 | Mott | June 21, 1955 |
| 2,831,308 | Raba | Apr. 22, 1958 |
| 2,929,190 | Woody | Mar. 22, 1960 |